United States Patent
A

(10) Patent No.: US 9,491,067 B2
(45) Date of Patent: Nov. 8, 2016

(54) TIMEOUT FOR IDENTIFYING NETWORK DEVICE PRESENCE

(71) Applicant: Cisco Technology, Inc., San Jose, CA (US)

(72) Inventor: Prabhakar A, Bangalore (IN)

(73) Assignee: Cisco Technology, Inc., San Jose, CA (US)

(*) Notice: Subject to any disclaimer, the term of this patent is extended or adjusted under 35 U.S.C. 154(b) by 518 days.

(21) Appl. No.: 13/859,215

(22) Filed: Apr. 9, 2013

(65) Prior Publication Data

US 2014/0304394 A1    Oct. 9, 2014

(51) Int. Cl.
*G06F 15/173* (2006.01)
*H04L 12/26* (2006.01)
*H04L 29/08* (2006.01)
*H04L 29/06* (2006.01)

(52) U.S. Cl.
CPC .......... *H04L 43/00* (2013.01); *H04L 43/0805* (2013.01); *H04L 43/10* (2013.01); *H04L 67/2852* (2013.01); *H04L 69/28* (2013.01)

(58) Field of Classification Search
CPC ... H04L 12/26; H04L 67/2852; H04L 69/28; H04L 43/10; H04L 43/0805; H04L 67/00; H04L 43/00; H04L 67/145
See application file for complete search history.

(56) References Cited

U.S. PATENT DOCUMENTS

| | | | |
|---|---|---|---|
| 6,683,873 B1* | 1/2004 | Kwok et al. | 370/389 |
| 7,085,841 B2* | 8/2006 | Edwards et al. | 709/230 |
| 7,349,979 B1* | 3/2008 | Cieslak et al. | 709/238 |
| 7,849,502 B1* | 12/2010 | Bloch et al. | 726/11 |
| 7,991,905 B1* | 8/2011 | Roussos et al. | 709/231 |
| 2013/0067059 A1* | 3/2013 | Gatta | H04L 12/12 709/224 |
| 2013/0067060 A1* | 3/2013 | Thaler | G06F 1/3209 709/224 |
| 2013/0067260 A1* | 3/2013 | Gatta | G06F 1/3209 713/323 |
| 2014/0115150 A1* | 4/2014 | Ewanchuk | H04W 76/045 709/224 |

* cited by examiner

*Primary Examiner* — Benjamin M Thieu
(74) *Attorney, Agent, or Firm* — Parker Ibrahim & Berg LLC; James M. Behmke; Stephen D. LeBarron

(57) ABSTRACT

Systems and techniques relating to identifying the presence of a network device are described. A described technique includes receiving, from the cache engine, a traffic flow and a series of notification signals, each indicating a presence of the cache engine, calculating a timeout value based on at least a time difference of two consecutive notification signals of the series of notification signals, updating, based on the calculated timeout value, a predetermined timeout period to an updated timeout period, and determining an absence of the cache engine when the updated timeout period that immediately succeeds the receiving of the series of notification signals elapsed without receiving an additional notification signal from the cache engine.

18 Claims, 3 Drawing Sheets

TIMEOUT FOR IDENTIFYING NETWORK DEVICE PRESENCE

TECHNICAL FIELD

The following disclosure relates to timeout for identifying a network device presence.

BACKGROUND

In communication/computer networks, a network device can show its presence to a network switch by sending a notification message over communication links. If the notification message is received within a timeout period, the network switch can send a confirmation message to confirm the presence of the network device. If the notification message is not received within the timeout period, the network switch may determine that the network device is not present and terminate the communications between the network device and the network switch. In some cases, the notification messages may be delayed due to high data traffic on the communication links.

DESCRIPTION OF FIGURES

Like reference symbols in the various drawings indicate like elements.

DESCRIPTION OF EXAMPLE IMPLEMENTATIONS

Overview

Figure 1:
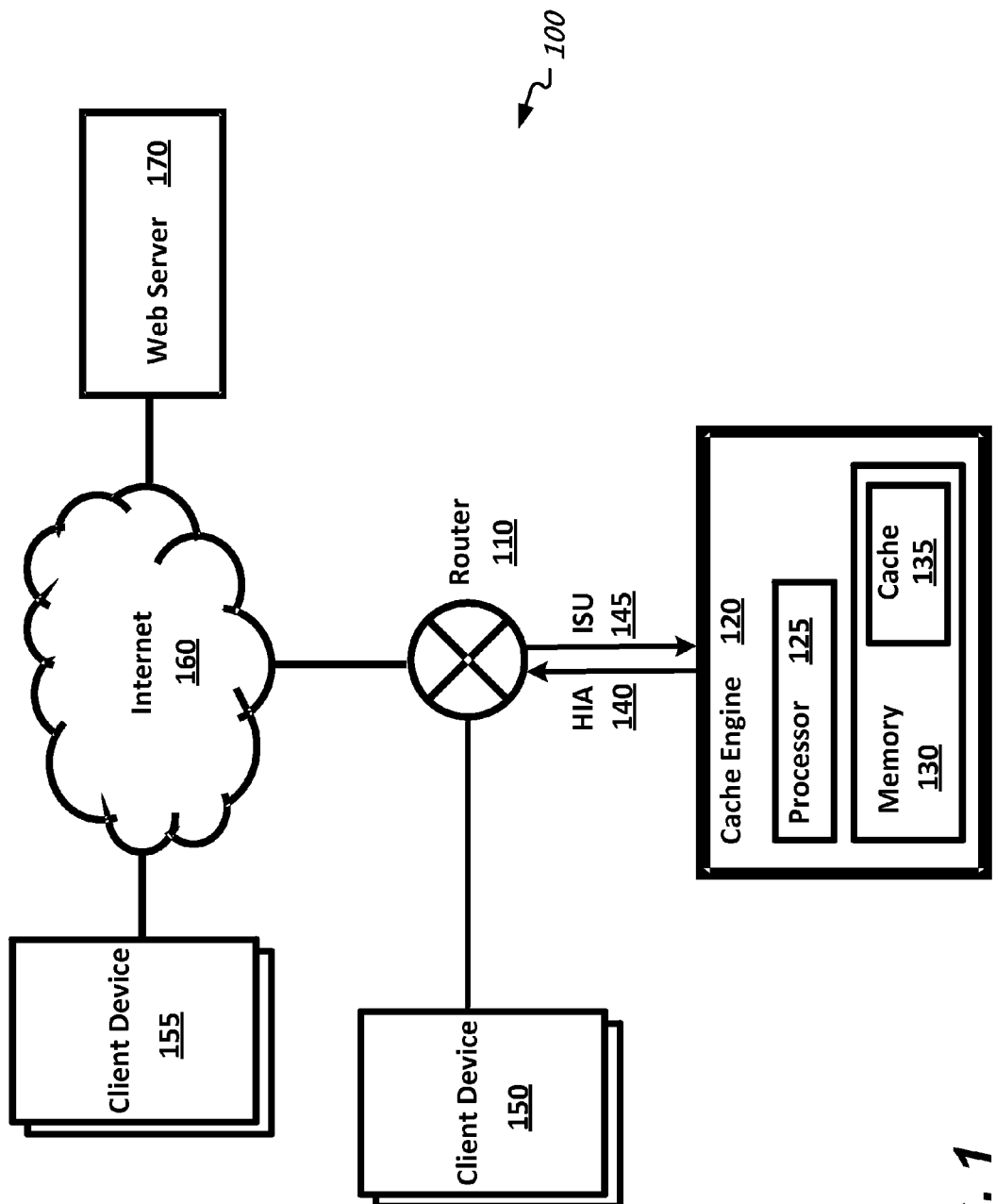
FIG. 1 is a schematic representation of an example communication system suitable for one or more implementations according to the present disclosure.

This disclosure provides descriptions of various configurations of systems, apparatus and methods for using a timeout period determined based on time differences of previously received notification signals to identify the presence of network devices. In some configurations, systems, apparatus and methods may generally include one or more of the following features. A network switch receives, from a cache engine, a traffic flow and a series of notification signals, each indicating a presence of the cache engine. The network switch calculates a timeout value based on at least a time difference of two consecutive notification signals of the series of notification signals. The network switch then updates a predetermined timeout period to an updated timeout period based on the calculated timeout value and determines an absence of the cache engine when the updated timeout period that immediately succeeds the receiving of the series of notification signals elapses without receiving an additional notification signal from the cache engine.

DETAILED DESCRIPTION

The present disclosure is directed to managing timeout for identifying network device presence. In a general aspect, a communication network can include a network switch for switching traffic between communication links so as to interconnect network devices in the communication network. One example network device can be a cache engine. The cache engine can be used to maintain a set of the network objects in the cache and/or run the cache included in the cache engine. An example cache engine may be a Cisco® cache engine, which can be used to localize network traffic patterns in the location network, in order to enable content requests to be fulfilled locally. Traffic localization can reduce transmission costs and download time off network traffic.

In some aspects, a cache engine can notify its presence to the network switch by sending notification signals to the network switch through a communication link. If the network switch identifies that the cache engine is not present, the network switch can terminate its communication with the cache engine in order to save system resources. The identification of the presence of the cash engine can be based on a predetermined timeout period. The predetermined timeout value can be estimated by the cache engine and sent to the network switch before the transmissions of the notification signals. The network switch can determine that the cash engine is not presented when no notification signal is received within the predetermined timeout period. However, when the data and/or control traffic load on the communications link between the network switch and the cache engine is high, the time for the cache engine to process the traffic data may increase, which results in delayed transmission of the notification signal. In some cases, one or more notification signals may be lost due to the high traffic volume.

In order to avoid identifying the cache engine as not present when one or more notification signals are delayed or missed, the network switch can calculate an extended timeout period when traffic is present on the communications link. The calculation of the extended timeout period can be based on at least the time difference between two consecutively received notification signals. In some implementations, the extended timeout period can be updated dynamically based on change of time differences between the consecutively received notification signals. The network switch can then use the extended timeout period to identify the presence of the cache engine. The network engine terminates the communication with the cache engine when no notification signal is received within the extended timeout period. By using the extended timeout period for identifying the presence of the cache engine under data and/or control traffic, the network switch reduces the probability of terminating communication with the cache engine when the cache engine is actually presented.

FIG. 1 is a schematic representation of an example communication system 100 suitable for one or more implementations according to the present disclosure. The example system 100 in FIG. 1 comprises high-level components including a router 110, a cache engine 120, a web server 170, client devices 150, 155 and Internet 160.

The example communication system 100 includes a cache engine 120 (e.g., Cisco cache engine). The cache engine 120 can transmit and receive messages from a router 110 and/or other devices included in or coupled to the example system 100. The cache engine 120 can communicate with other devices included in or coupled to the example system 100 using a communication medium. For example, the communication medium can include coaxial cable, optical fiber, or wireless channel. The cache engine 120 can communicate with other devices using a communication protocol. For example, the communication protocol can be a Web Cache Communication Protocol (WCCP), a HyperText Transfer Protocol (HTTP), or a File Transfer Protocol (FTP).

The cache engine 120 includes a processor 125 and a memory 130. Although illustrated as a single processor 125 in FIG. 1, two or more processors may be used according to particular needs, desires, or particular embodiments of example system 100. Each processor 125 may be a central processing unit (CPU), a blade, an application specific integrated circuit (ASIC), a field-programmable gate array (FPGA), or another suitable component. Generally, the processor 125 executes instructions and manipulates data to perform the operations of the cache engine 120 and, specifically, the computer programs associated with cache 135. Processors 125 suitable for the execution of a computer program include, by way of example, both general and special purpose microprocessors, and any one or more processors of any kind of digital computer.

Generally, a processor 125 will receive instructions and data from a read-only memory, a random access memory, or both. The essential elements of a cache engine 120 are a processor 125 for performing actions in accordance with instructions and one or more memory devices for storing instructions and data. Generally, a cache engine 120 will also include, or be operatively coupled to receive, data from or transfer data to, or both, one or more mass storage devices for storing data, e.g., magnetic, magneto optical disks, or optical disks. However, a cache engine 120 need not have such devices. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto optical disks; CD-ROM and DVD-ROM disks. The processor 125 and the database (or memory) can be supplemented by, or incorporated in, special purpose logic circuitry.

The memory 130 can include any memory or database module and can take the form of volatile or non-volatile memory including, without limitation, magnetic media, optical media, random access memory (RAM), read-only memory (ROM), removable media, or any other suitable local or remote memory component. Memory 130 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the example system 100. Additionally, memory 130 may include any other appropriate data, such as VPN applications, firmware logs and policies, firewall policies, a security or access log, print or other reporting files, as well as others. The memory 130 includes a cache 135. In some cases, the cache engine 120 can maintain computer programs, network objects and data memory in the cache 135.

The router 110 is used to route data traffic and control messages transmitted to and received from the cache engine 120 and/or the client device 150. The router 110 includes a standard networking router that is capable of inspecting and transmitting IP packets. In addition, if behavioral security methods are implemented, the router 110 is also used for enforcing security rules that permit allowed communications traffic to flow between the cache engine 120 and the network Internet 160. In some implementations, a router 110 may be considered as a network switch (e.g., Cisco Nexus® 7000 Series Switch). The network switch is a networking device that is used to switch traffic from one communications link to another so as to interconnect the devices in the example system. In addition, or as an alternative to being used for interconnecting devices, the network switch may also be used for enforcing security rules that permit allowed communications traffic to flow between devices in the example system 100.

In order for the router 110 to identify the presence of the cache engine 120, the cache engine 120 can communicate protocol messages with the router 110. For example, if the WCCP is used for the communications between the router 110 and the cache engine 120, the cache engine 120 can send a "Here I Am" (HIA) message 140 periodically to the router 110 to indicate its presence. In response, the router 110 can send an "I See U" (ISU) message 145 to confirm the recipient of the HIA. After receiving an HIA message, if the router 110 does not receive the next HIA message 140 from the cache engine 120 within a timeout period, the router 110 can determine that the cache engine 120 is not present and terminate the WCCP link between the cache engine 120 and the router 110.

In some implementations, the cache engine 120 can estimate a timeout value and send the estimated timeout value to the router 110 for identifying the presence of the cache engine 120. The estimation may be based on a capability of the cache engine to sendi user datagram protocol (UDP) packets at a minimum interval [Inventor: Please verify this and explain further on how the timeout value is initially estimated by the cache engine]. However, when the traffic load of the communication link between the router 110 and the cache engine 120 increases, the cache engine 120 can go into processing mode and delay the scheduled transmission of the HIA message 140. The processing time of data/control traffic can also vary among different cache engines produced by different manufacturers. In some cases, one or more HIA messages 140 may be lost due to heavy traffic load. To adapt to the possible delay and/or loss of HIA messages 140, the router 110 can calculate an extended timeout period when traffic is detected on the communication link between the router 110 and the cache engine 120. Accordingly, the router 110 can determine that the cache engine 120 is not present when no HIA message 140 is received within the extended timeout period. The calculation can be based on at least a time difference of two consecutive HIA messages 140 received previously by the router 110.

The example system 100 includes client devices 150, 155. The client devices 150, 155 can be any computing devices that can communicate protocol messages supported by the example system 100. Example client devices can include a desktop computer, a laptop computer, a smartphone, and tablet computer. The client devices 150, 155 can communicate with any component included in or coupled to the example system 100. For example, a client device 155 can communicate with a web server 170 through the Internet 160. The client device 155 can also communicate with another client device 150 and/or the cache engine 120 through the Internet 160 and the router 110. The router 110 can switch traffic received from the network components it serves (e.g., client device 150 and cache engine 120) and the Internet 160.

The web server 170 can be used to manage content that can be accessed through the Internet. At a high level, a web server 170 includes an electronic computing device operable to receive, transmit, process, store, or manage data and information associated with the example system 100. The web server 170 may be responsible for responding to the received requests by processing said requests in the associated hosted applications (not shown) or web services, and sending the appropriate response back to the requesting entity (e.g., the client devices 150, 155). The web server 170 may also store one or more applications and process the one or more applications for providing services to client devices 150, 155 operating in the example system 100.

Figure 2:
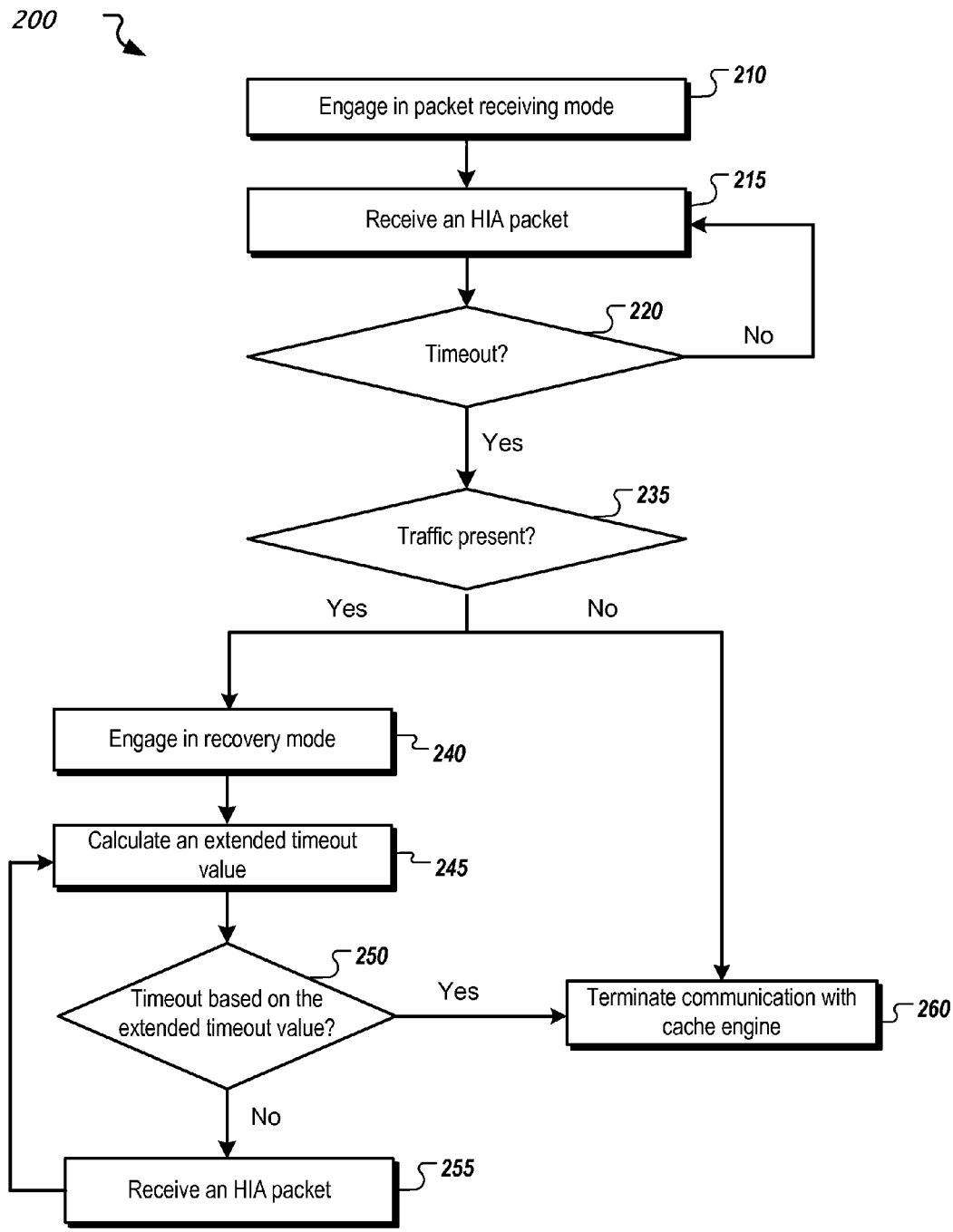
FIG. 2 is a flowchart showing an example process of engaging in different timeout modes for identifying presence of a cache engine.

FIG. 2 is a flowchart showing an example process 200 of engaging in different timeout modes for identifying presence of a cache engine. The example process 200 can be performed by a network switch, e.g., a router, such as the router 110 described with regard to FIG. 1. At 210, the network switch engages in packet receiving mode. In the packet receiving mode, the network switch can receive and identify packets, including an HIA packet, sent from a cache engine. The cache engine may be any cache engine suitable for one or more implementations of the present disclosure, such as the cache engine 120 described with respect to FIG. 1.

In the packet receiving mode, the network switch can determine the presence of a cache engine when the network switch receives an HIA packet at 215 within a predetermined timeout period. The predetermined timeout period can be a timeout value estimated by the cache engine based on a traffic load of the communication link between the network switch and the cache engine. The cache engine can then send the estimated timeout value to the network switch, such that the network switch can use it to determine the presence of the cache engine. In some implementations, the estimated timeout value can exceed a timeout value range defined by settings of the network switch. In such cases, the network switch can use a default timeout value as the predetermined timeout value to identify the presence of the cash engine. In some implementations, the predetermined timeout value can be determined based on a timeout value previously calculated by the network switch.

After receiving the HIA packet at 215, the network switch determines whether there is a timeout at 220. In other words, the network switch determines at 220 whether at least another HIA packet is received within the timeout period based on the predetermined timeout value. If there is no timeout at the network switch, the example process 200 returns to 215 where the network switch receives another HIA packet. Otherwise, the example process 200 proceeds to 235, where the network switch determines whether traffic is present on the communications link between the network switch and the cache engine. If there is no traffic present on the communications link, the example process proceeds to 260, where the network switch terminates communication with the cache engine. In such case, the network switch determines that the cache engine is not presented. Otherwise, the example process 200 proceeds to 240.

At 240, the network switch engages in recovery mode. In the recovery mode, the network switch can still maintain the communication link from the cache engine even when no HIA message is received within the predetermined timeout period. At 245, the network switch calculates an extended timeout value. In some implementations, the calculation of the extended timeout value may be based on an algorithm. At least a time difference between two consecutive HIA packets received can be a parameter of the algorithm.

For example, the extended timeout value can be calculated based on the following example algorithm. When the network switch engages in the recovery mode, the network switch calculates an extended timeout value based on times of the previous three consecutive HIA packets received. If the times of receiving the three consecutive HIA packets are X1, X2 and X3, respectively, the time differences of each two consecutively received HIA packets can be calculated respectively as, Y=X3−X2 and Z=X2−X1. $T_{ext}$ denotes the extended timeout period and $T_{pre}$ denotes a previously calculated timeout period or the predetermined timeout period if no previously calculated timeout period is available. If Y>Z, the extended timeout period can be calculated as $T_{ext}=T_{pre}+(Y-Z)*1.5$. If Y<Z, the extended timeout period can be calculated as $T_{ext}=T_{pre}-(Z-Y)*0.5$. If Y=Z, then $T_{ext}=T_{pre}$.

As another example, the extended timeout value can be calculated based on the following example algorithm. When the network switch engages in the recovery mode, the network switch calculates an extended timeout value based on times of the previous six consecutive HIA packets received. If the times of receiving the six consecutive HIA packets are X1, X2, X3, X4, X5 and X6, respectively, the time differences of each two consecutively received HIA packets can be calculated, respectively, as Y1=X6−X5, Y2=X5−X4, Y3=X4−X4, Y4=X3−X2, and Y5=X2−X1. If Y2=Y1, Y4=Y3, and Y5>Y4, the extended timeout period can be calculated as $T_{ext}=2*T_{pre}$. The extended timeout period can be calculated differently based on different time differences between each two consecutively received HIA packets. [Inventor: Please add any additional algorithms that are suitable for calculating the extended timeout period.]

It is to be understood that the two algorithms described above are example algorithms for calculating the extended timeout period. The time differences of two consecutively received HIA packets are associated with the traffic load of the communication link between the network switch and the cache engine. For example, if the traffic load is high, the cache engine may spend more time on processing the data and/or control traffic. Accordingly, the time difference of two consecutively received HIA packets can be relatively high. Therefore, any algorithms that can calculate the extended timeout value based on parameters associated with the traffic pattern of the communication link can be used.

At 250, the network switch determines if there is a timeout based on the calculated extended timeout value. If yes, then no HIA packet has been received within the extended timeout period, and the example process 200 proceeds to 260, where the network switch determines that the cache engine is no longer present and terminates communication with the cache engine. Otherwise, the example process 200 proceeds to 255, where the network switch receives an HIA packet within the extended timeout period. In some implementations, the example process 200 returns to 245, where the network switch calculates the extended timeout value further based on a time the HIA packet is received at 255.

Figure 3:
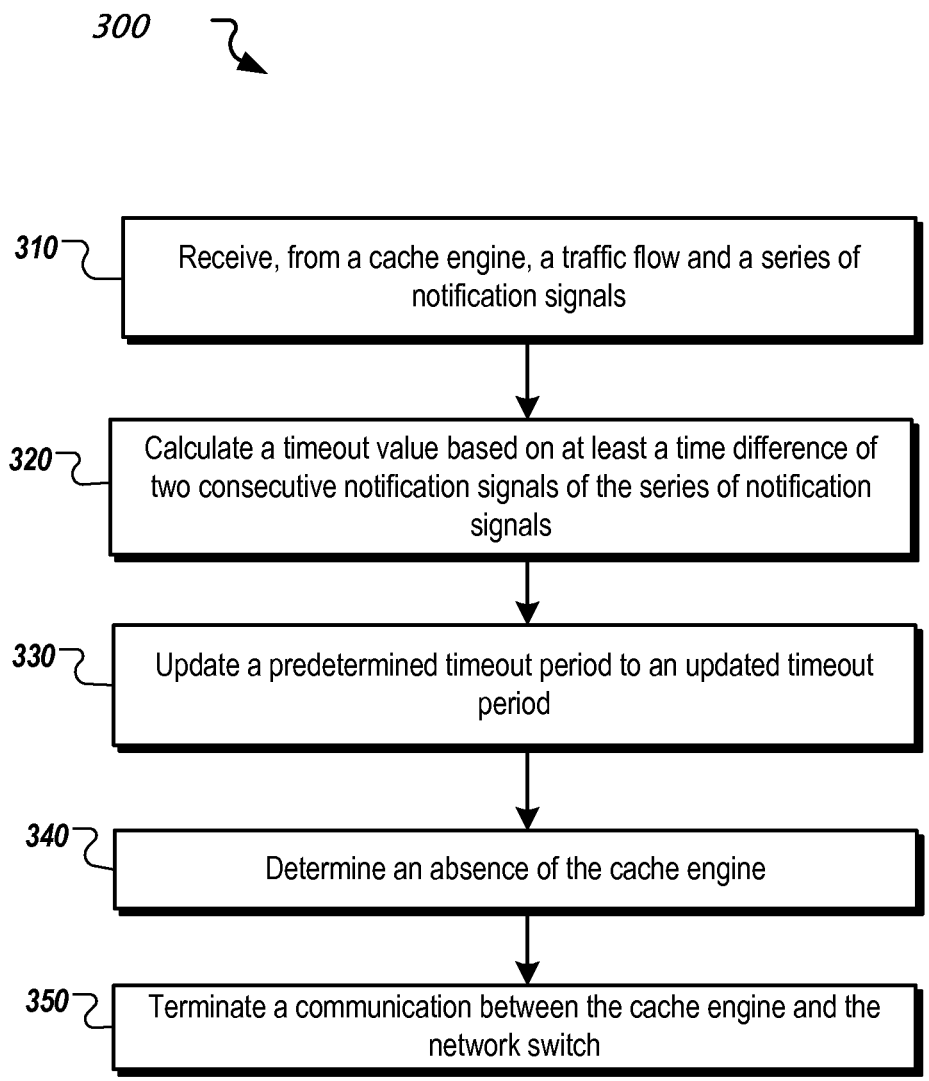
FIG. 3 is a flowchart showing an example process of identifying presence of a cache engine.

FIG. 3 is a flowchart showing an example process 300 for identifying presence of a cache engine. The example process 300 can be performed by a network switch, e.g., a router, such as the router 110 described with regard to FIG. 1. At 310, the network switch receives, from a cache engine, a traffic flow and a series of notification signals. The traffic flow can include a data traffic flow for data transmissions or a control traffic flow for control signal transmissions. The notification signals can be used to notify the network switch of the presence of the cache engine. For example, the series of notification signals can be a series of HIA signals defined in WCCP.

At 320, the network switch calculates a timeout value based on at least a time difference of two consecutive notification signals of the series of notification signals. The calculation of the timeout value may be based on an algorithm such as the algorithms as described with regard to FIG. 2. At 330, the network switch updates a predetermined timeout period to an updated timeout period based on the calculated timeout value. In some implementations, the predetermined timeout period is an estimated timeout value received from the cache engine, and the received estimated timeout value is within a predetermined range based on settings of the network switch. In some implementations, the estimated timeout value received from the cache engine is outside of the predetermined range of timeout value. Then the predetermined timeout period is a default timeout value configured at the network switch. In some implementations, the calculated timeout value is outside of the predetermined range of timeout value configured at the network switch. The timeout period is then updated to a maximum of the predetermined range. After receiving the series of notification signals, if no additional notification signal is received within the updated timeout period, the example process 300 proceeds to 340.

At 340, the network switch determines an absence of the cache engine. At 350, the network switch terminates the communication between the cache engine and the network switch based on determining the absence of the cache engine.

While this specification contains many specific implementation details, these should not be construed as limitations on the scope of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described components and systems may generally be integrated together in a single product or packaged into multiple products.

In the present disclosure, "each" refers to each of multiple items or operations in a group, and may include a subset of the items or operations in the group and/or all of the items or operations in the group. In the present disclosure, the term "based on" indicates that an item or operation is based, at least in part, on one or more other items or operations and may be based exclusively, partially, primarily, secondarily, directly, or indirectly on the one or more other items or operations.

A number of implementations have been described. Nevertheless, it will be understood that various modifications may be made without departing from the spirit and scope of the disclosure. Accordingly, other implementations are within the scope of the following claims.

What is claimed is:

1. A method performed at a network switch, comprising:
receiving, from a cache engine at a router in a computer network, a traffic flow and a series of notification signals each indicating a presence of the cache engine;
calculating, by the router, a timeout value based on at least a time difference of two consecutive notification signals of the series of notification signals;
updating by the router, based on the calculated timeout value, a predetermined timeout period to an updated timeout period;
determining, by the router, an absence of the cache engine when the updated timeout period that immediately succeeds the receiving of the series of notification signals elapsed without receiving an additional notification signal from the cache engine; and
terminating a communication between the cache engine and the network switch when the cache engine is determined to be absent.

2. The method of claim 1, wherein the traffic flow is at least one of a data traffic flow or a control traffic flow.

3. The method of claim 1, wherein at least one of the series of notification signals is a "here I am" (HIA) signal that is included in a web cache communication protocol (WCCP).

4. The method of claim 1, wherein the calculation of the timeout value is further based on the predetermined timeout period.

5. The method of claim 1, wherein the calculation of the timeout value is further based on an algorithm, and the at least the time difference of two consecutive notification signals is an input parameter of the algorithm.

6. The method of claim 1, wherein the predetermined timeout period is a previously calculated timeout value.

7. The method of claim 1, wherein the predetermined timeout period is an estimated timeout value received from the cache engine, and the received estimated timeout value is within a predetermined range of timeout value configured at the network switch.

8. The method of claim 7, wherein the predetermined timeout period is a default timeout value configured at the network switch, and the received estimated timeout value is outside of the predetermined range of timeout value configured at the network switch.

9. The method of claim 7, wherein the predetermined timeout period is updated to a maximum value of the predetermined range of timeout value when the calculated timeout value is outside of the predetermined range.

10. A system comprising:
a cache engine; and
a network switch operable to perform operations including:
receiving, from the cache engine, a traffic flow and a series of notification signals each indicating a presence of the cache engine;
calculating a timeout value based on at least a time difference of two consecutive notification signals of the series of notification signals;
updating, based on the calculated timeout value, a predetermined timeout period to an updated timeout period;
determining an absence of the cache engine when the updated timeout period that immediately succeeds the receiving of the series of notification signals elapsed without receiving an additional notification signal from the cache engine; and
terminating a communication between the cache engine and the network switch when the cache engine is determined to be absent.

11. The system of claim 10, wherein the traffic flow is at least one of a data traffic flow or a control traffic flow.

12. The system of claim 10, wherein at least one of the series of notification signals is a "here I am" (RIA) signal that is included in a web cache communication protocol (WCCP).

13. The system of claim 10, wherein the calculation of the timeout value is further based on the predetermined timeout period.

14. The system of claim 10, wherein the calculation of the timeout value is further based on an algorithm, and the at least the time difference of two consecutive notification signals is an input parameter of the algorithm.

15. The system of claim 10, wherein the predetermined timeout period is a previously calculated timeout value.

16. The system of claim 10, wherein the predetermined timeout period is an estimated timeout value received from the cache engine, and the received estimated timeout value is within a predetermined range of timeout value configured at the network switch.

17. The system of claim 16, wherein the predetermined timeout period is a default timeout value configured at the network switch, and the received estimated timeout value is outside of the predetermined range of timeout value configured at the network switch.

18. The system of claim 16, wherein the predetermined timeout period is updated to a maximum value of the predetermined range of timeout value when the calculated timeout value is outside of the predetermined range.

\* \* \* \* \*

UNITED STATES PATENT AND TRADEMARK OFFICE
CERTIFICATE OF CORRECTION

PATENT NO. : 9,491,067 B2  Page 1 of 1
APPLICATION NO. : 13/859215
DATED : November 8, 2016
INVENTOR(S) : Prabhakar A It is certified that error appears in the above-identified patent and that said Letters Patent is hereby corrected as shown below:

In the Specification

Column 4, Lines 24-27, please amend as shown:
capability of the cache engine to send user datagram
protocol (UDP) packets at a minimum interval. However, Column 6, Lines 22-23, please amend as shown:
packets.

Signed and Sealed this
Twelfth Day of October, 2021

Drew Hirshfeld
*Performing the Functions and Duties of the*
*Under Secretary of Commerce for Intellectual Property and*
*Director of the United States Patent and Trademark Office*